US009498862B2

(12) United States Patent
Noda et al.

(10) Patent No.: US 9,498,862 B2
(45) Date of Patent: Nov. 22, 2016

(54) VACUUM CUP POSITIONING DEVICE AND PROCESS FOR PRODUCING HANDLING ATTACHMENT USING THE SAME

(71) Applicant: TOYOTA SHATAI KABUSHIKI KAISHA, Kariya-shi (JP)

(72) Inventors: Shigeki Noda, Aichi (JP); Kazumi Itakura, Aichi (JP)

(73) Assignee: TOYOTA SHATAI KABUSHIKI KAISHA, Kariya-shi (JP)

( * ) Notice: Subject to any disclaimer, the term of this patent is extended or adjusted under 35 U.S.C. 154(b) by 193 days.

(21) Appl. No.: 14/356,324

(22) PCT Filed: Nov. 2, 2012

(86) PCT No.: PCT/JP2012/078463
§ 371 (c)(1),
(2) Date: May 5, 2014

(87) PCT Pub. No.: WO2013/080743
PCT Pub. Date: Jun. 6, 2013

(65) Prior Publication Data
US 2014/0312547 A1    Oct. 23, 2014

(30) Foreign Application Priority Data

Dec. 1, 2011    (JP) .................. 2011-263865

(51) Int. Cl.
*B23Q 5/00* (2006.01)
*B23Q 3/18* (2006.01)
(Continued)

(52) U.S. Cl.
CPC ............... *B23Q 3/18* (2013.01); *B23Q 1/527* (2013.01); *B23Q 3/088* (2013.01); *B23Q 3/186* (2013.01);
(Continued)

(58) Field of Classification Search
USPC ........................................... 269/12
See application file for complete search history.

(56) References Cited

U.S. PATENT DOCUMENTS 5,575,597 A * 11/1996 Bailey .................. B23Q 1/5462
408/234
7,481,310 B2 * 1/2009 Dodo ...................... B25J 9/106
198/465.3

(Continued)

FOREIGN PATENT DOCUMENTS

JP    5 228778    9/1993
JP    7-206211 A    8/1995
(Continued)

OTHER PUBLICATIONS

Office Action issued on Jan. 6, 2015 in Japanese Patent Application No. 2011-263865 with English translation.
(Continued)

*Primary Examiner* — Alvin Grant
(74) *Attorney, Agent, or Firm* — Oblon, McClelland, Maier & Neustadt, L.L.P.

(57) ABSTRACT

A handling attachment includes four vacuum cups to suction-hold a suction target surface of a workpiece and a support member which holds the vacuum cups so as to maintain a position relation among the vacuum cups. A device for positioning the vacuum cups has a base plate and four positioning jigs disposed on the base plate. The positioning jigs have, at their upper end, a dummy workpiece surface to be abutted with the vacuum cups. The dummy workpiece surface is allowed to change the position and to tilt in any direction.

10 Claims, 11 Drawing Sheets

(51) Int. Cl.
  *B25B 11/00* (2006.01)
  *F16M 11/04* (2006.01)
  *F16M 11/08* (2006.01)
  *F16M 11/10* (2006.01)
  *F16M 11/20* (2006.01)
  *F16M 11/28* (2006.01)
  *B23Q 3/08* (2006.01)
  *B23Q 1/52* (2006.01)

(52) U.S. Cl.
  CPC .............. *B25B 11/00* (2013.01); *B25B 11/005* (2013.01); *F16M 11/041* (2013.01); *F16M 11/08* (2013.01); *F16M 11/10* (2013.01); *F16M 11/2085* (2013.01); *F16M 11/2092* (2013.01); *F16M 11/28* (2013.01); *B23Q 2210/006* (2013.01); *Y10T 29/49758* (2015.01)

(56) References Cited

U.S. PATENT DOCUMENTS

| | | | | |
|---|---|---|---|---|
| 7,562,765 | B2* | 7/2009 | Dodo | B21D 43/11 198/468.01 |
| 8,087,869 | B1* | 1/2012 | Binford | B65G 59/005 414/789.5 |
| 8,348,590 | B2* | 1/2013 | Knobel | B25J 9/1065 414/729 |
| 8,387,932 | B2* | 3/2013 | Takahashi | F16B 47/006 248/205.5 |
| 2003/0205028 | A1* | 11/2003 | Sus | B65B 43/305 53/440 |
| 2004/0130085 | A1 | 7/2004 | Lim | |
| 2004/0218997 | A1* | 11/2004 | Neubauer | B66F 11/04 414/11 |
| 2005/0008469 | A1* | 1/2005 | Jung | B25J 15/0052 414/729 |
| 2007/0033790 | A1* | 2/2007 | Tsuchiya | B62D 65/02 29/407.1 |
| 2007/0102847 | A1* | 5/2007 | Ilda | B29C 45/1615 264/328.1 |
| 2008/0048084 | A1* | 2/2008 | Takahashi | F16B 47/00 248/363 |
| 2008/0210834 | A1* | 9/2008 | Takahashi | F16B 47/00 248/205.8 |
| 2009/0028676 | A1* | 1/2009 | Langlot | B65G 61/00 414/331.09 |
| 2009/0224117 | A1* | 9/2009 | Kaneda | F16B 47/00 248/206.3 |
| 2012/0027550 | A1* | 2/2012 | Bellacicco | B60P 1/00 414/547 |
| 2012/0043439 | A1* | 2/2012 | Liao | F16B 47/00 248/205.8 |
| 2013/0236282 | A1* | 9/2013 | Deng | H01L 21/6838 414/752.1 |
| 2014/0294540 | A1* | 10/2014 | Shaw | B66C 23/48 414/11 |

FOREIGN PATENT DOCUMENTS

| | | |
|---|---|---|
| JP | 10 71586 | 3/1998 |
| JP | 10 169046 | 6/1998 |
| JP | 10 299987 | 11/1998 |
| JP | 2004 195637 | 7/2004 |
| JP | 2005-230941 A | 9/2005 |
| JP | 2010-58213 A | 3/2010 |

OTHER PUBLICATIONS

International Search Report Issued Dec. 4, 2012 in PCT/JP12/078463 Filed Nov. 2, 2012.

* cited by examiner

VACUUM CUP POSITIONING DEVICE AND PROCESS FOR PRODUCING HANDLING ATTACHMENT USING THE SAME

TECHNICAL FIELD

The present invention relates to a vacuum cup positioning device in a handling attachment having a plurality of vacuum cups and a process for producing the handling attachment using the same.

BACKGROUND ART

In production processes of, for example, an automobile body panel and so on, a carrying device provided with a handling attachment is employed in some cases in order to feed a workpiece to a pressing machine and take out it therefrom.

The handling attachment has a plurality of vacuum cups to suction-hold a suction target surface of a workpiece and a support member which holds the vacuum cups (Patent Documents 1 and 2).

In such a handling attachment, a plurality of vacuum cups are each disposed to face the suction target surface of the workpiece at corresponding positions with corresponding tilt angles to the suction target surface of the workpieces by the support member. Positioning of vacuum cups in production of the handling attachment has been conventionally carried out by arranging a workpiece actually manufactured by press forming in a position in correspondence with a posture on a production line by means of a jig and positioning the suction target surface of the workpiece and the vacuum cups.

PRIOR ART DOCUMENT

Patent Documents

Patent Document 1: JP-A-2004-195637
Patent Document 2: JP-A-05-228778

SUMMARY OF THE INVENTION

Problem to be Solved by the Invention

However, the aforesaid method for positioning vacuum cups in a handling attachment involves the following problems.

In the method for positioning vacuum cups as described above, the positioning of vacuum cups is carried out using the workpiece actually manufactured by press forming as a basis of positioning. Therefore, a handling attachment needs to be produced after producing a die for a workpiece, which results in that the handling attachment production is postponed. Thus, it is difficult to timely complete the handling attachment, and the handling attachment needs to be produced in a short time.

In addition, it takes time to arrange the workpiece in a position in correspondence with the posture on the production line, and the positioning of the suction target surface is not stable due to deflection, dimensional errors etc. of the workpiece. Therefore, adjustment must be carried out again on an actual production line.

The present invention aims to provide a vacuum cup positioning device which enables the production of a handling attachment with high accuracy before the completion of the workpiece, and a process for producing a handling attachment using the same.

Means for Solving the Problem

One aspect of the present invention is a vacuum cup positioning device for use in the production of a handling attachment having a plurality of vacuum cups to suction-hold a suction target surface of a workpiece and a support member which holds the vacuum cups so as to maintain a position relation among the vacuum cups, which includes a base plate; and a plurality of positioning jigs disposed on the base plate, wherein the positioning jigs include, at their upper end, a dummy workpiece surface to be abutted with the vacuum cups, and wherein the dummy workpiece surface is allowed to change the height position and to tilt in any direction.

Another aspect of the present invention is a process for producing a handling attachment having a plurality of vacuum cups to suction-hold a suction target surface of a workpiece and a support member which holds the vacuum cups so as to maintain a position relation among the vacuum cups, which includes a step of adjusting the dummy workpiece surfaces of the respective positioning jigs in the vacuum cup positioning device to have respectively predetermined height, tilting direction and tilt angle, and a step of forming the support member for holding the vacuum cups by adjusting the shape of the support member so that the vacuum cups are abutted with the dummy workpiece surfaces.

Effect of the Invention

The dummy workpiece surface in the above-described vacuum cup positioning device is allowed to change a height position and to tilt in any direction. Therefore, by setting the height position and tilt of the dummy workpiece surface as desired, the suction target surface of the workpiece can be simulatedly reproduced by the above-described dummy workpiece surface. Accordingly, also at a stage before the completion of the workpiece, the above-described vacuum cup positioning device can be used to position the vacuum cups to produce a handling attachment.

Also, accuracy deterioration factors such as dimensional errors and deflection, which are unavoidable in a case of using a workpiece, can be eliminated by setting the height and tilt angle of the above-described dummy workpiece surface by means of the above-described positioning jigs. This can improve the accuracy in positioning of vacuum cups to provide a handling attachment with high accuracy.

Also, in the above-described process for producing a handling attachment, information about the height, tilt direction and tilt angle is preliminarily obtained from design data and the like, and then the dummy workpiece surface of the vacuum cup positioning device can be set based on this information. Thus, a handling attachment with high accuracy can be produced also at a stage before the completion of the workpiece.

The above-described vacuum cup positioning device and process for producing a handling attachment using the same enables the production of a handling attachment with high accuracy also at a stage before the completion of the workpiece.

MODE FOR CARRYING OUT THE INVENTION

In the vacuum cup positioning device, the positioning jigs are allowed to change a position to be disposed on the base plate.

In this case, the positioning jigs can easily adjust the position of the above-described dummy workpiece surface in the horizontal direction orthogonal to the height direction, and can be easily used in the production of a handling attachment compatible with workpieces having different shapes.

The positioning jigs may include a rotating mechanism to rotate the dummy workpiece surface around a vertical axis which passes through a center of the dummy workpiece surface and a tilting mechanism to tilt the dummy workpiece surface in one direction around a lateral axis which passes through the center of the dummy workpiece surface.

In this case, the tilt angle of the above-described dummy workpiece surface can be easily set by two elements, i.e., the rotation angle around the above-described vertical axis as the rotation center and the tilt angle around the above-described lateral axis as the rotation center.

The lateral axis which serves as a rotation center of the tilting mechanism preferably passes through the center of the dummy workpiece surface.

In this case, both of the above-described vertical axis and the above-described lateral axis pass through the center of the dummy workpiece surface. Therefore, the center of the above-described dummy workpiece surface is located in the same position before and after setting of the tilt angle of the above-described dummy workpiece surface by means of the above-described rotating mechanism and the above-described tilting mechanism. Accordingly, by setting the position of the above-described dummy workpiece surface based on the center as a reference, readjustment of the position of the above-described dummy workpiece surface can be omitted also when the tilt angle is changed. This can improve the work efficiency in adjusting the position and tilt angle of the above-described dummy workpiece surface.

In the process for producing a handling attachment, the support member has a coupling part to be coupled to a carrying device prepared separately and a plurality of support pipes provided extendingly from the coupling part to hold the vacuum cups at the tip ends thereof, and the support member is preformed to hold the vacuum cups at the tip ends of the support pipes and to position the vacuum cups close to the dummy workpiece surfaces prior to forming the support member.

In this case, the support pipes are readily formed in a short time in the step of forming the support member.

EMBODIMENT

Example 1

An Example relating to a vacuum cup positioning device and a process for producing a handling attachment using the same will be described with reference to FIG. 1 to FIG. 11.

Figure 10:
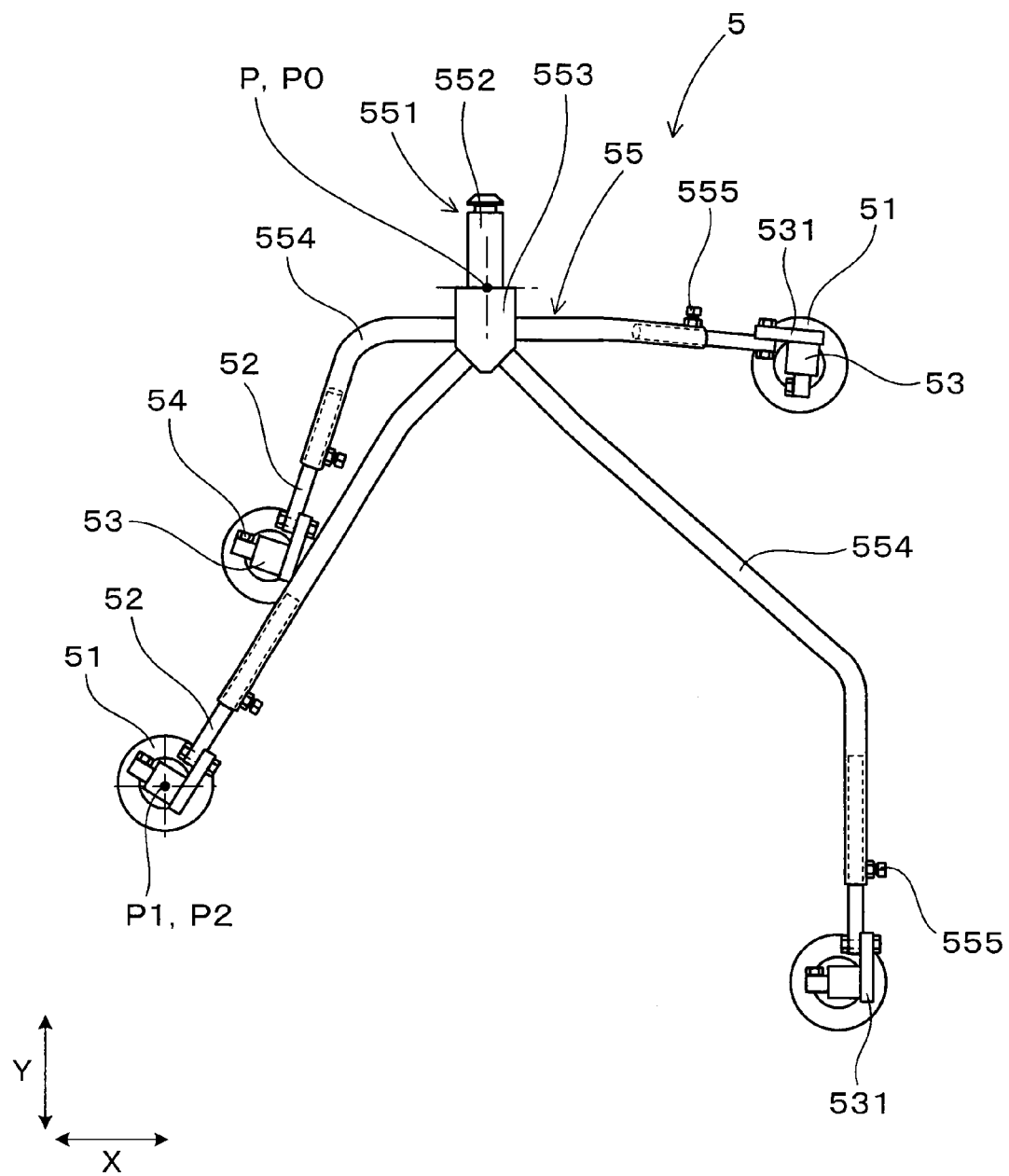
FIG. 10 is a plan view showing a handling attachment in Example 1.

As shown in FIG. 10, a handling attachment 5 produced in this Example has four vacuum cups 51 to suction-hold an suction target surface of a workpiece and a support member 55 which holds these vacuum cups so that the mutual position relation among the vacuum cups 51 is maintained.

The support member 55 has a coupling part 551 to be coupled to a carrying device (not shown), four support pipes 554 provided extendingly from the coupling part 551 and vacuum cups 51 respectively disposed at the each tip end of the support pipes 554.

The coupling part 551 has a coupling grip part 552 to be gripped by the carrying device and a coupling base part 553 on which the support pipes 554 are disposed, and four support pipes 554 are disposed on the coupling base part 553.

The support pipes 554 have a hollow cylindrical shape, and the vacuum cups 51 are held at the tip end parts thereof via small-diameter pipes 52 which will be described later. Also, fixing bolts 555 are disposed in the support pipes 554 to fix the small-diameter pipes 52.

The vacuum cup 51 has a truncated cone shape, the diameter of which expands toward a workpiece, and an end face of the vacuum cup, disposed to face the workpiece, forms an open end which wholly opens. Also, on an end face of the vacuum cup 51 opposite to the open end, a rectangular block part 53 and a small-diameter pipe 52 coupled to the block part 53 are disposed.

Figure 11:
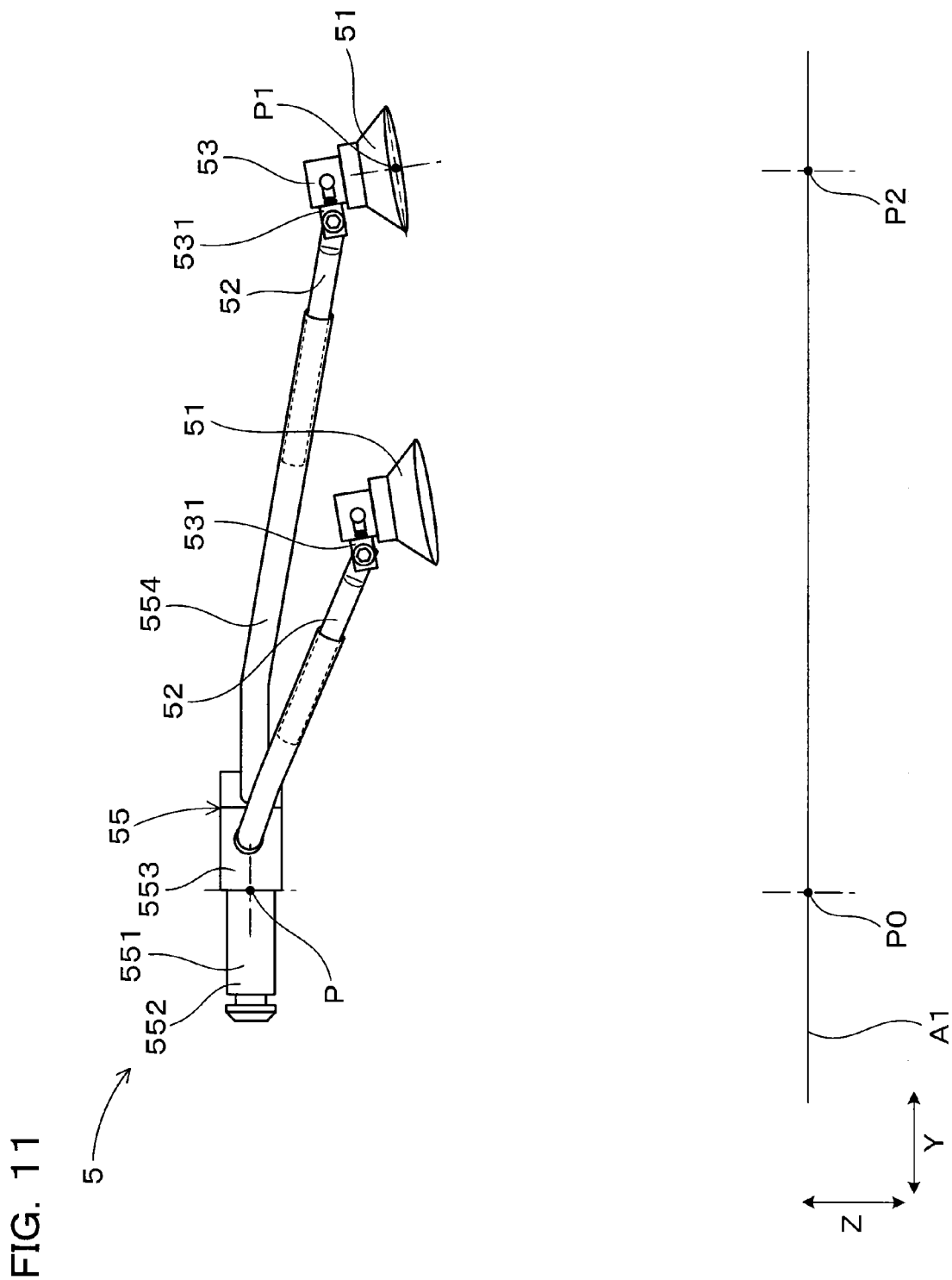
FIG. 11 is a side view showing the handling attachment in Example 1.

As shown in FIG. 10 and FIG. 11, a pipe fixing plate 531 which fixes the small-diameter pipe 52 is disposed in the block part 53. The pipe fixing plate 531 and the small-diameter pipe 52 are fixed by screwing a nut with a bolt disposed through the both. In the state where fastening between the bolt and the nut is loosened, the small-diameter pipe 52 and the pipe fixing plate 531 can be relatively rotated around the center axis of the bolt as the rotation center, so that the tilt angle of the vacuum cups 51 can be changed in the positioning of the vacuum cup 51.

As shown in FIG. 10 and FIG. 11, the outer diameter of the small-diameter pipe 52 coupled with the pipe fixing plate 531 is smaller than the inner diameter of the support pipe 554, and the pipe 52 is inserted into the inner circumferential side of the support pipe 554 and fixed onto the support pipe 554 by means of the fixing bolt 555 as described above. In the state where the fixing bolt 555 is loosened, the small-diameter pipe 52 can be moved in the axial line direction with respect to the support pipe 554, and can also be rotated around the axial line. Thus, the position and tilt angle of the vacuum cup 51 can be changed in the positioning of the vacuum cup 51.

Also, the support member 55 having the above-described configuration, is preformed to hold the vacuum cups 51 at the tip ends of the support pipes 554 and to position the vacuum cups 51 close to the dummy workpiece surfaces 100 at a preliminary stage prior to the support member forming step in which the support pipes 554 are formed by use of the device 1 for positioning the vacuum cups 51.

It is noted that the support member 55 of this Example is configured so that the position and tilt angle of the vacuum cup 51 can be changed as described above. However, the support member to which the positioning device 1 of this Example is applied is not limited thereto, and those having various structures such as a structure in which a support pipe and a vacuum cup are directly coupled to each other can be used.

Next, the positioning device 1 will be explained.

Figure 7:
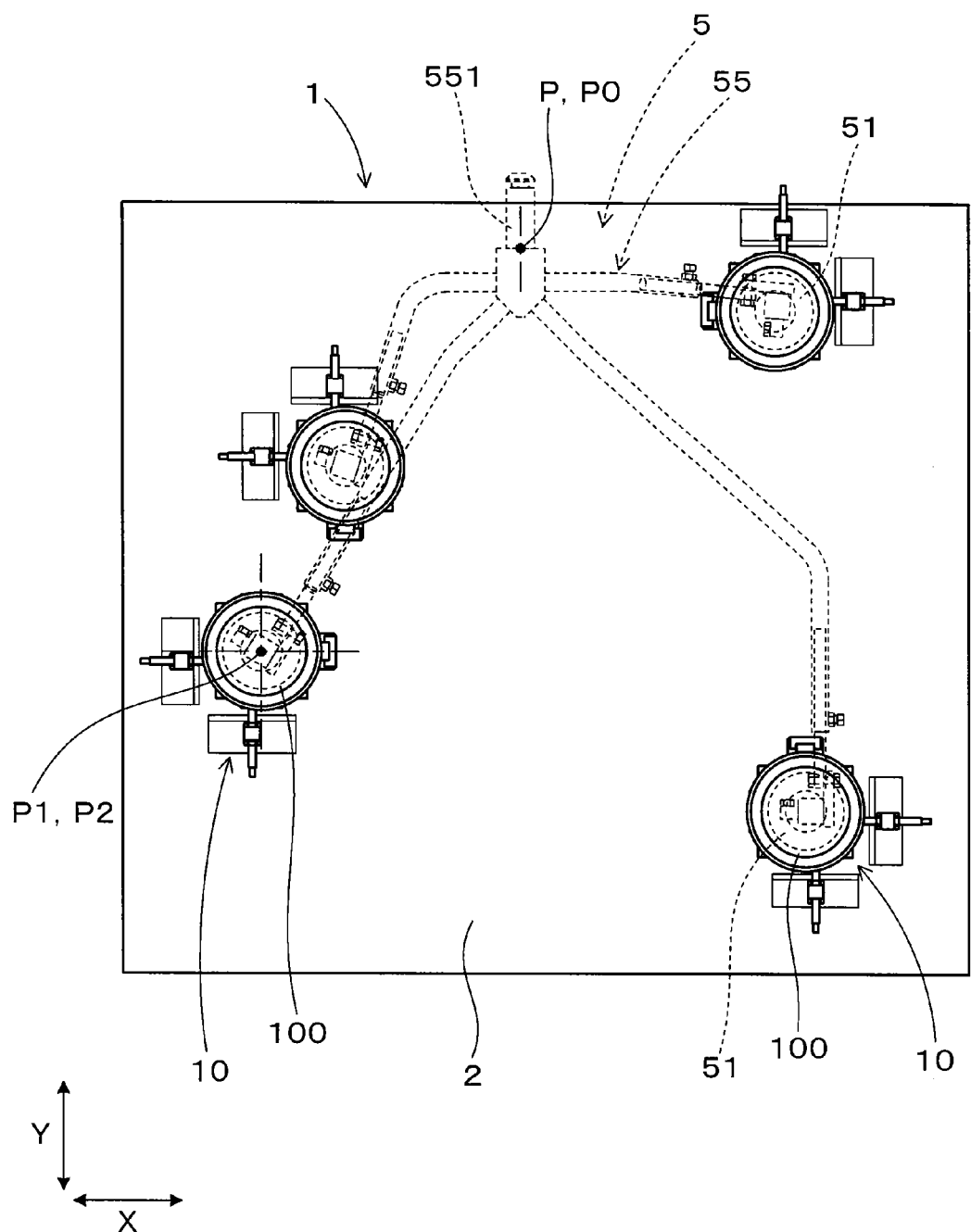
FIG. 7 is an explanatory view showing the arrangement of vacuum cup positioning jigs in Example 1.

As shown in FIG. 7, the device 1 for positioning the vacuum cups 51 has a base plate 2 and four positioning jigs 10 arranged on the base plate 2. The positioning jigs 10 have, at their upper end, dummy workpiece surfaces 100 to be abutted with the vacuum cups 51. The dummy workpiece surfaces 100 are configured to be changed in position and to be tilted in any direction.

Hereinafter, the device 1 for positioning the vacuum cups 51 of this Example will be explained in more detail.

As shown in FIG. 7, the base plate 2 is composed of a surface plate formed in a rectangular shape when viewed from above. In this Example, the direction vertical to the upper face of the base plate 2 is expressed as height direction Z. The direction parallel to one side of the base plate 2 on the side on which the coupling part 551 of the handling attachment 5 is disposed is expressed as lateral direction X. The direction orthogonal to both the height direction Z and the lateral direction X is expressed as depth direction Y. A plurality of positioning holes (not shown) disposed at equal intervals in the lateral direction X and depth direction Y are formed in the upper face of the base plate 2.

Figure 1:
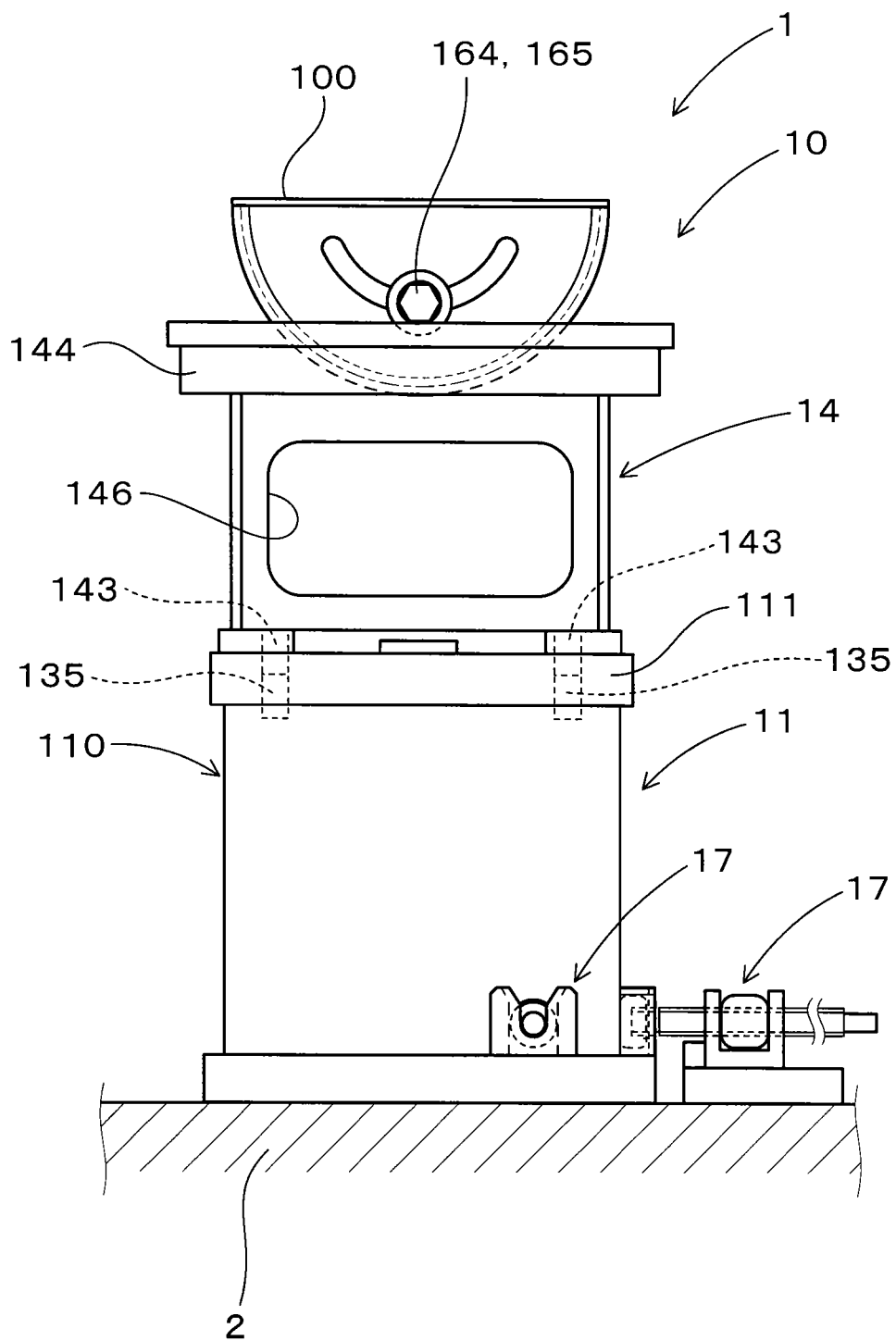
FIG. 1 is an explanatory view showing a vacuum cup positioning device in Example 1.

As shown in FIG. 1, the positioning jig 10 arranged on the base plate 2 has, at its upper end, a dummy workpiece surface 100 to be abutted against the vacuum cup 51. Also, the positioning jig 10 has a height adjusting mechanism part 11 which can change the height position thereof, a tilt adjusting mechanism part 14 which can change the tilt angle and a position adjusting mechanism part 17 which can change the arrangement position in the lateral direction X and the depth direction Y on the base plate 2.

Figure 4:
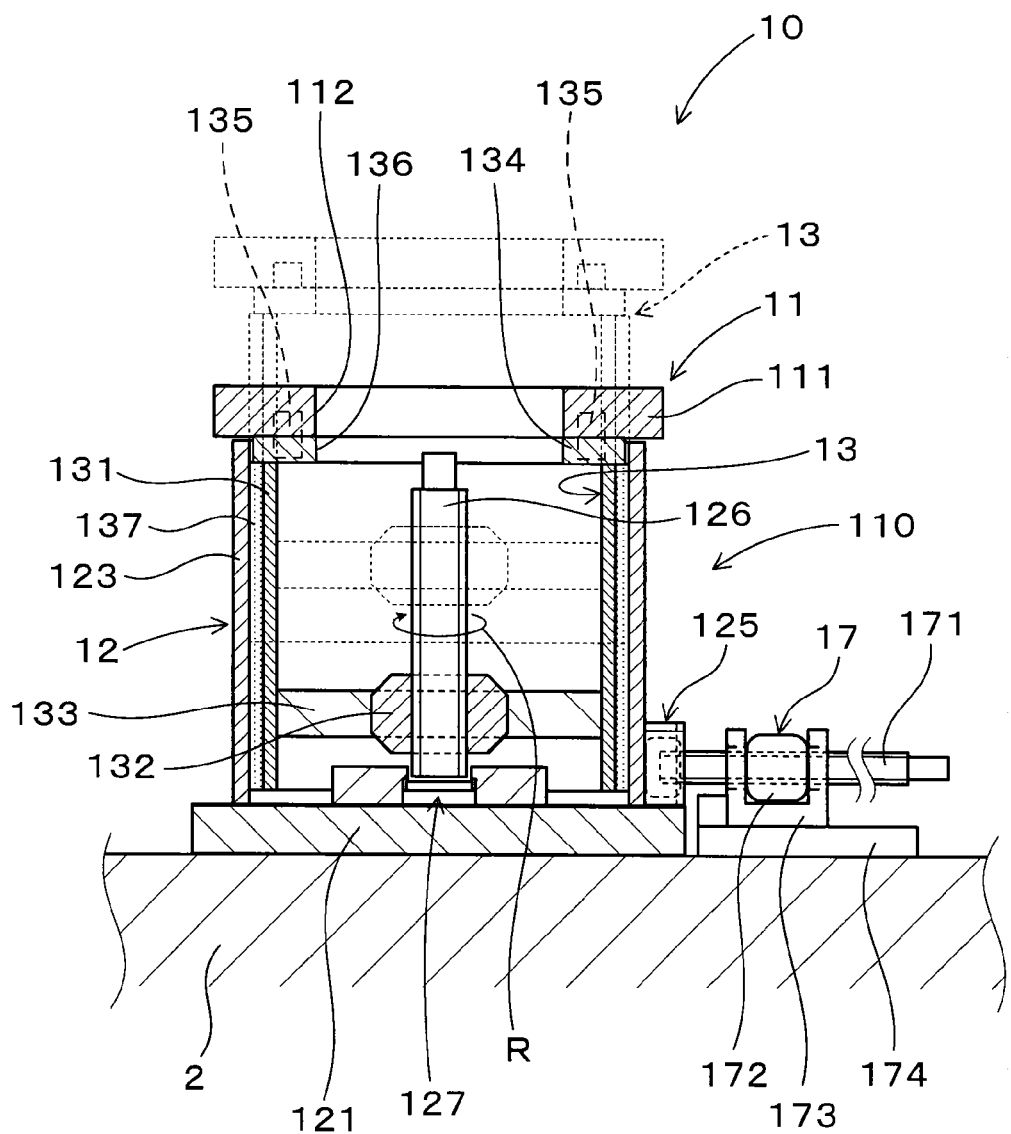
FIG. 4 is a cross sectional view showing a height adjusting mechanism part and a position adjusting mechanism part in Example 1.
Figure 5:
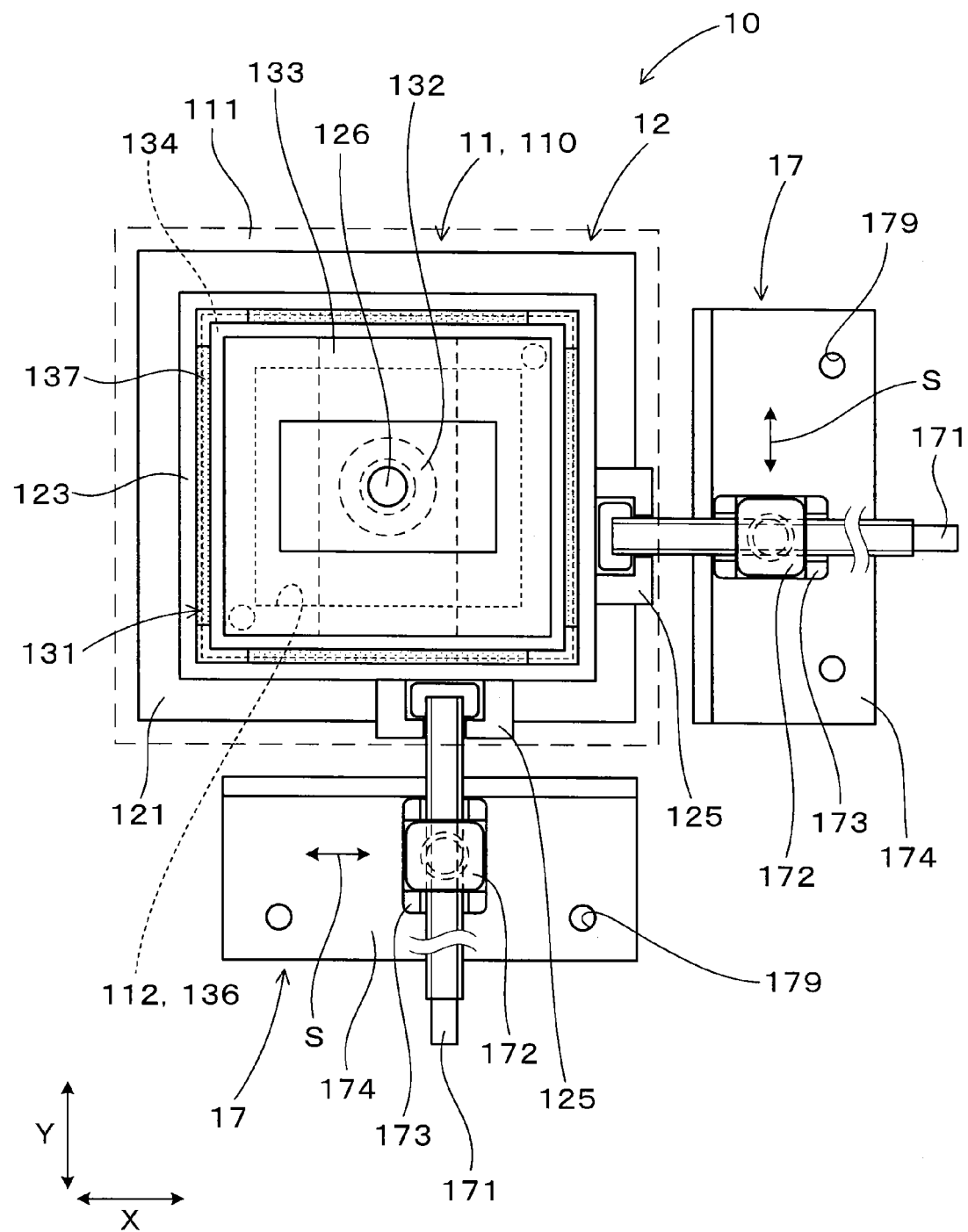
FIG. 5 is a plan view showing the height adjusting mechanism part and the position adjusting mechanism part in Example 1.

As shown in FIG. 4 and FIG. 5, the height adjusting mechanism part 11 has a lifting mechanism part 110 having an outer part 12 and an inner part 13 and a spacer 111 arranged in the upper part of the lifting mechanism part 110.

As shown in FIG. 4 and FIG. 5, the lifting mechanism part 110 has an outer part 12 disposed on the base plate 2 and an inner part 13 disposed inside the outer part 12.

The outer part 12 has an outer bottom part 121 disposed abutting with the upper face of the base plate 2 and an outer side wall part 123 erected upward from the outer bottom part 121.

The outer bottom part 121 is formed of a flat plate having a rectangular shape when viewed from above, and, on its upper face, the outer side wall part 123 is provided.

The outer side wall part 123 has a square cylindrical shape having a rectangular shape smaller than the outer diameter of the outer bottom part 121 when viewed from above, and disposed in such a manner that its open ends are directed in the vertical direction. Among the four wall faces which form the outer side wall part 123, one pair of wall faces, which are disposed opposite to each other, are orthogonal to the lateral direction X, and another pair of wall faces are disposed orthogonal to the depth direction Y. A screw shaft engaging part 125 is disposed on the respective outer circumferential faces of the adjacent two wall faces of the outer side wall part 123, and configured to be connectable with a tip end of a position adjustment screw shaft 171 provided in the position adjusting mechanism part 17.

A lifting screw shaft 126, which is erected upward, is disposed inside the outer side wall part 123 and at the center part of the outer bottom part 121. The lifting screw shaft 126 is disposed in such a manner that its axial line passes through the center of the dummy workpiece surface 100. A bearing 127 is disposed between the lifting screw shaft 126 and the outer bottom part 121, and the lifting screw shaft 126 is disposed so that it can be rotated relatively with the outer bottom part 121 around its axial line.

As shown in FIG. 4 and FIG. 5, the inner part 13 disposed inside the outer part 12 has an inner side wall part 131 having a square cylindrical shape, a lifting nut 132 disposed inside the inner side wall part 131, and a lid body 134 disposed on the upper end part of the inner side wall part 131.

The inner side wall part 131 having a square cylindrical shape is disposed in such a manner that its open ends are directed in the vertical direction, and a shim material 137 is disposed on the respective flat faces in the outer circumferential face of the inner side wall part 131. Also, on the inner circumferential face of the inner side wall part 131, a nut fixing plate 133 is disposed between a pair of opposite wall parts so as to connect them. A lifting nut 132 is disposed on the nut fixing plate 133, and is screwed with the lifting screw shaft 126 in the outer part 12.

The lid body 134, which is disposed on the upper end part of the inner side wall part 131, is formed of a flat plate having a rectangular shape when viewed from above, and a positioning pin 135 is provided in a position inside a pair of angular parts located diagonally. Also, in a position inside from the positioning pin 135 of the lid body 134, a working port 136 is formed through the inside of the inner side wall part 131 to rotate the lifting screw shaft 126.

As shown in FIG. 4, in the lifting mechanism part 110, the inner part 13 coupled with the lifting nut 132 can be elevated by rotating the lifting screw shaft 126 in a normal direction (arrow R direction). Also, the inner part 13 can be lowered by rotating the lifting screw shaft 126 in a reverse direction opposite to the normal direction.

As shown in FIG. 4 and FIG. 5, the two screw shaft engaging parts 125 disposed on the outer circumferential faces of the outer side wall part 123 are respectively provided with the position adjusting mechanism parts 17.

The respective position adjusting mechanism parts 17 have a position adjustment screw shaft 171 and a position adjustment nut 172. A cylindrical engaging part to be engaged with the screw shaft engaging part 125 is provided at the tip end part of the position adjustment screw shaft 171. The position adjustment nut 172 is disposed in a nut holder 173, and configured to be slidable in an arrow S direction (FIG. 5) on a positioning plate 174 disposed on the base plate 2 and to be fixed in the axial line direction of the position adjustment screw shaft 171.

The position adjusting mechanism part 17 rotates the position adjustment screw shaft 171 so as to move the position adjustment screw shaft 171 in its axial line direction. This makes it possible to move the positioning jig 10 in the lateral direction X and the depth direction Y.

Also, the positioning jig 10 is fixed onto the base plate 2 using the position adjusting mechanism part 17. The position adjusting mechanism part 17 is fixed onto the base plate 2 by means of a bolt and the like while aligning a through hole 179 provided in the positioning plate 174 with a positioning hole (not shown) provided in the base plate 2.

As shown in FIG. 1, FIG. 4 and FIG. 5, the spacer 111 is arranged on the upper face of the lid body 134 of the inner part 13.

Figure 6:
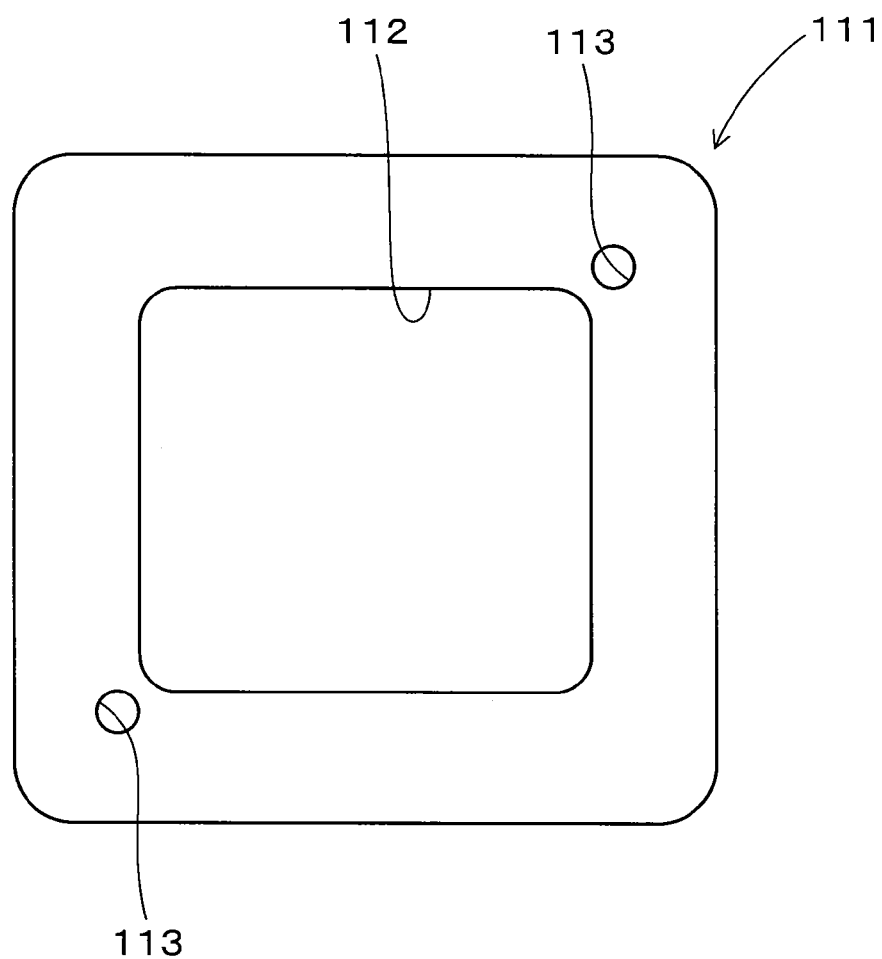
FIG. 6 is a plan view showing a spacer in Example 1.

As shown in FIG. 5 and FIG. 6, the spacer 111 is formed of a flat plate having a rectangular shape when viewed from above, and the plate thickness of which can be set to a desired dimension. Also, the spacer 111 has a pin hole 113 formed at a position corresponding to the positioning pin 135 of the lid body 134 and a working port 112 for rotating the lifting screw shaft 126. In this Example, the adjustment of the height of the dummy workpiece surface 100 involves carrying out rough adjustment by use of the spacer 111 and fine adjustment by means of the lifting mechanism part 110. Also, the height adjusting mechanism part 11 in this Example employs one spacer 111, but can also use a stack of a plurality of spacers 111 or spacers 111 different in thickness. It is also possible to remove the spacer 111 and to carry out height adjustment by means of the lifting mechanism part 110.

As shown in FIG. 1, the tilt adjusting mechanism part 14 for adjusting the tilt angle of the dummy workpiece surface 100 is disposed above the height adjusting mechanism part 11.

Figure 2:
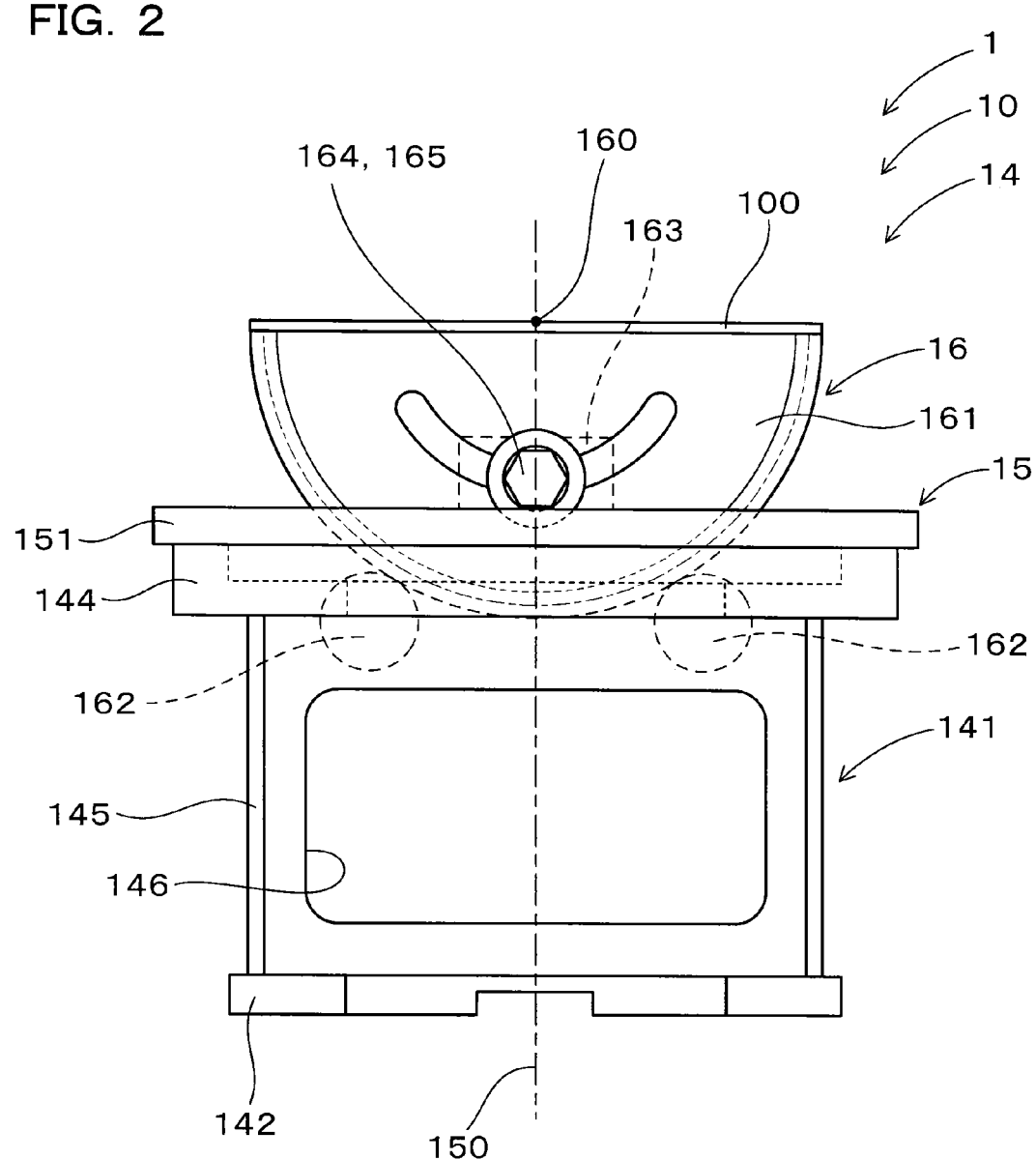
FIG. 2 is a side view showing an angle adjusting mechanism part in Example 1.
Figure 3:
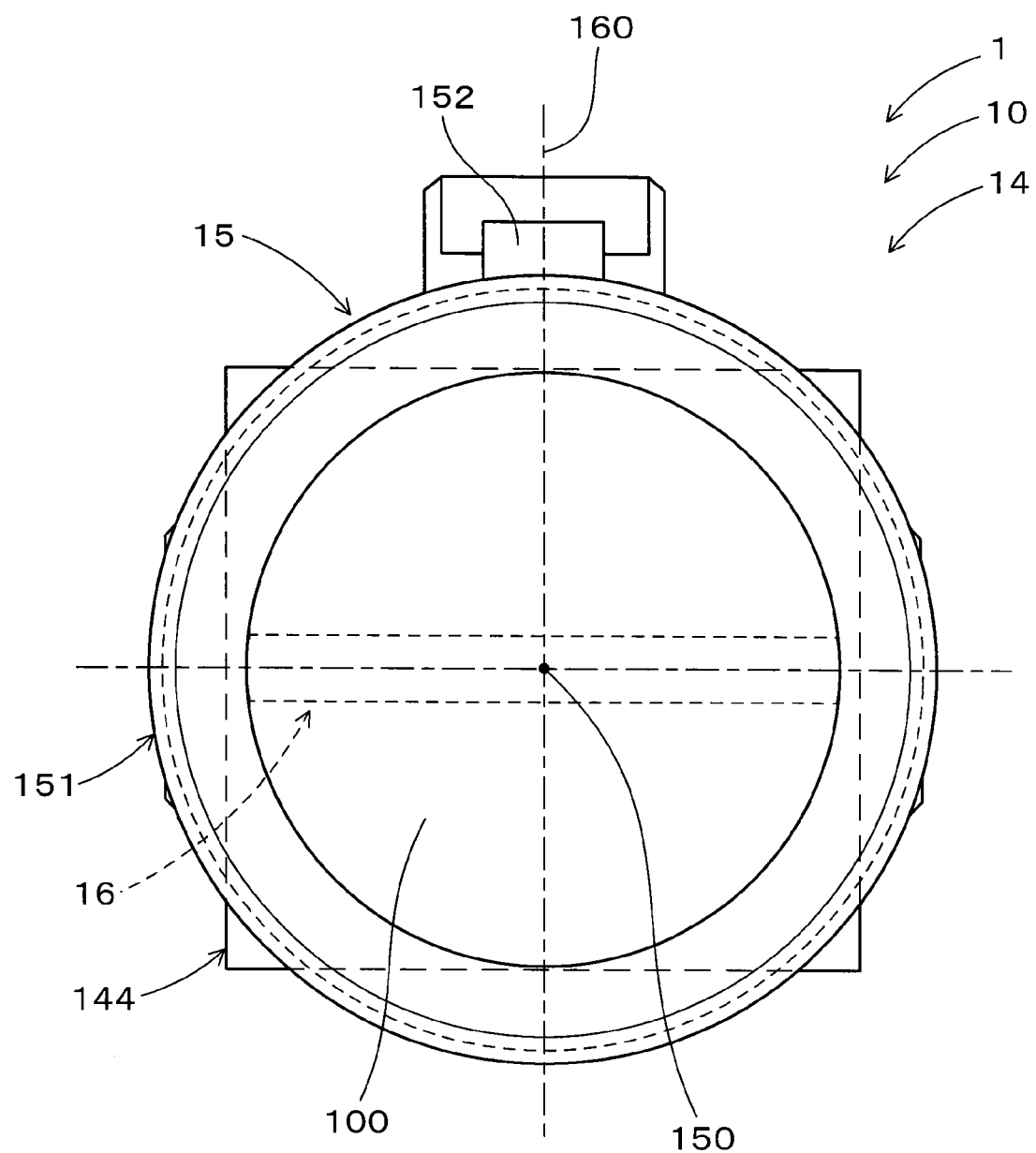
FIG. 3 is a plan view showing the angle adjusting mechanism part in Example 1.

As shown in FIG. 2 and FIG. 3, the tilt adjusting mechanism part 14 has a dummy workpiece surface 100 to be abutted with the vacuum cup 51 disposed at its upper end part, a rotating mechanism 15 which rotates the dummy workpiece surface 100 on the horizontal face, a tilting mechanism 16 which tilts the dummy workpiece surface 100 to the horizontal face, and a base part 141 to be combined with the spacer 111.

The base part 141 has a bottom face part 142 having a rectangular shape when viewed from above and a square cylindrical base side wall part 145 erected upward from the bottom face part 142. A positioning pin 143 (FIG. 1) is provided in a position corresponding to a pin hole 113 of the spacer 111 in the bottom face part 142. The base side wall part 145 has a working port 146 penetrating to the inside thereof, and a tool can be inserted from this working port 146 through the working port 136 of the lid body 134 of the lifting mechanism part 110 and the working port 112 of the spacer 111, and can rotate the lifting screw shaft 126 of the lifting mechanism part 110 as described above.

Also, as shown in FIG. 2, a base lid body 144 is disposed at the upper end part of the base side wall part 145, and a rotating mechanism 15 is disposed on the base lid body 144.

The rotating mechanism 15 has a rotary gear 151 composed of a spur gear and a fixing block 152 to be meshed with the rotary gear 151.

The rotary gear 151 is composed of a spur gear as described above, and its center axial line forms a vertical axis 150 which passes through the center point of the dummy workpiece surface 100 and is in parallel with the height direction Z. The rotary gear 151 is held on the base lid body 144 so as to be turnable around the vertical axis 150 as the rotation center. Angle scales (not shown), which are provided in the upper face of the rotary gear 151, make it possible to check the rotation angle of the dummy workpiece surface 100. Also, as shown in FIG. 2, the rotary gear 151 has two auxiliary gears 162 to be meshed with a tilting gear 161 of the tilting mechanism 16.

As shown in FIG. 2, the fixing block 152 is disposed on the outer circumferential side of the rotary gear 151. The fixing block 152 comprises a gear tooth part to be meshed with the rotary gear 151, and fixed onto the base lid body 144 by means of a bolt (not shown). When the fixing block 152 is removed from the base lid body 144 to release the meshing between the fixing block 152 and the rotary gear 151, the rotary gear 151 is brought in a turnable state. Also, when the fixing block 152 is fixed onto the base lid body 144 to mesh the fixing block 152 with the rotary gear 151, the rotary gear 151 can be fixed.

As shown in FIG. 2 and FIG. 3, the rotary gear 151 of the rotating mechanism 15 is provided with the tilting mechanism 16 which tilts the dummy workpiece surface 100.

The tilting mechanism 16 has a pair of auxiliary gears 162 axially supported in a rotatable manner inside the rotary gear 151 and a tilting gear 161 to be meshed with the pair of auxiliary gears 162.

As shown in FIG. 2, the tilting gear 161 has a semicircular shape formed by dividing a spur gear into two, and its center axis passes through the center point of the dummy workpiece surface 100, and forms a lateral axis 160 vertical to the vertical axis 150.

The dummy workpiece surface 100 is provided on the flat face disposed in the upper part of the tilting gear 161.

The dummy workpiece surface 100 is composed of a disk-like flat plate, and its outer diameter is set to be larger than the outer diameter of the vacuum cup 51. A guide line (not shown) including a circle having a diameter corresponding to the outer diameter of the vacuum cup 51 is provided in the dummy workpiece surface 100.

The tilting gear 161 is fastened and fixed by use of a bolt 164 and a nut 165 onto a fixing bracket 163 extending upward from the rotary gear 151, and is brought in a state where the tilt angle can be changed by loosening the fastening between the bolt 164 and the nut 165. Also, angle scales, which are provided in the side face of the tilting gear 161, make it possible to check the tilt angle of the dummy workpiece surface 100.

As shown in FIG. 2, the pair of auxiliary gears 162 to be meshed with the tilting gear 161 are axially supported in a rotatable manner, inside the rotary gear 151, around an axial line parallel to the lateral axis 160 as the rotation center. The tilting gear 161 can be rotated around the lateral axis 160 as the rotation center by meshing both of the pair of auxiliary gears 162 with the tilting gear 161.

Next, an explanation will be made about a process for producing a handling attachment 5 using the device 1 for positioning the vacuum cups 51 configured in the above manner.

The production of the handling attachment 5 is carried out via two steps, i.e., a step of adjusting a dummy workpiece surface and a step of forming a support member.

The dummy workpiece surface adjusting step involves setting the position and tilt angle of the dummy workpiece surface 100 in the positioning jig 10 based on the position and tilt angle of the vacuum cup 51 preliminarily obtained from the design data on the handling attachment 5.

As shown in FIG. 11, the position of the vacuum cup 51 obtained from the design data can be expressed by the position of the center point P1 of a circle forming the open end of the vacuum cup 51 to be abutted with a workpiece and the tilt state (tilt angle d2 and tilting direction d1) of a flat face including the circle.

As shown in this figure, the position of the center point P1 can be expressed using, as an original point, an original point P0 obtained by projecting, onto the base plate 2, the position P where a coupling part 551 is disposed. As shown in FIG. 7, the dummy workpiece surface adjusting step for adjusting the position, tilting direction and tilt angle of the dummy workpiece surface 100 in the positioning jig 10 is carried out based on the position, tilt angle and tilting direction of the center point P1.

Firstly, the positioning device 10 is placed on the base plate 2 so that the center point P1 is disposed directly above the center of the dummy workpiece surface 100.

In a position adjacent to a coordinate P2 obtained by projecting the center point P1 onto the base plate 2, the positioning jig 10 is placed, and fixed onto the base plate 2 by means of the positioning plate 174 of the position adjusting mechanism part 17. Then, the position adjustment screw shaft 171 which constitutes the position adjusting mechanism part 17 is rotated, thereby adjusting the position in such a manner that the center point of the dummy workpiece surface 100 is arranged on the coordinate P2.

Next, the height position of the dummy workpiece surface 100 is adjusted.

Figure 8:
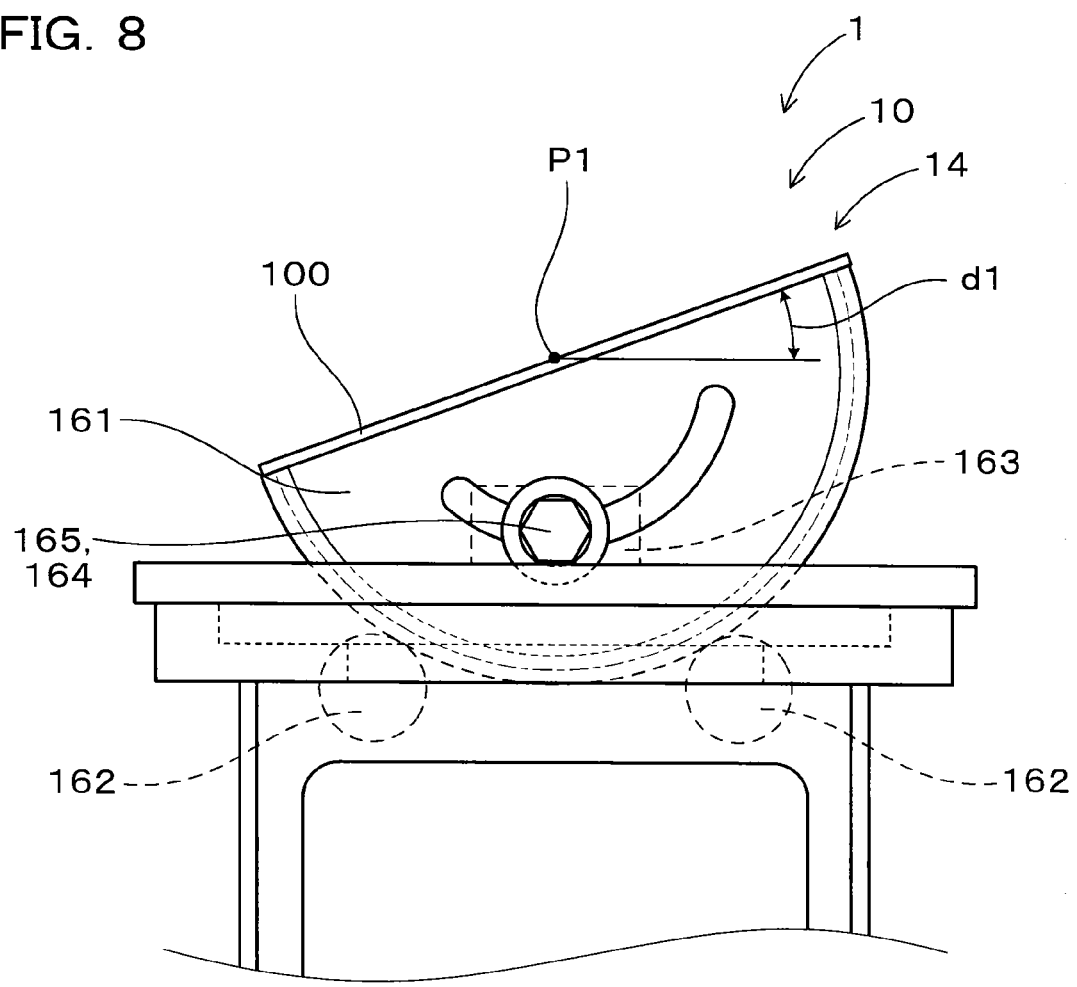
FIG. 8 is an explanatory view showing a tilting mechanism of the angle adjusting mechanism part in Example 1.

A tool is inserted from the working port 146 formed in the base side wall part 145 of the tilt adjusting mechanism part 14 shown in FIG. 2 to rotate the lifting screw shaft 126 in a normal rotation direction. The lifting nut 132 meshed with the lifting screw shaft 126 is fed to the axial direction, so that the inner part 13 coupled with the lifting nut 132 and the tilt adjusting mechanism part 14 disposed in the upper part thereof are elevated. As shown in FIG. 8, the height position of the dummy workpiece surface 100 disposed at the upper end of the tilt adjusting mechanism part 14 is adjusted so that the height position of its center matches the height of the center point P1. Thus, the center of the dummy workpiece surface 100 is disposed in a position corresponding to the center point P1 of the vacuum cup 51 in the design data.

Next, as shown in FIG. 8, the tilt angle of the dummy workpiece surface 100 is set by the tilting gear 161 of the tilt adjusting mechanism part 14.

As shown in this figure, the bolt 164 and the nut 165 which fasten and fix the tilting gear 161 and the fixing bracket 163 are loosened to rotate the tilting gear 161 at a tilt angle d1. The bolt 164 and nut 165 are fastened again to fix the tilting gear 161.

Figure 9:
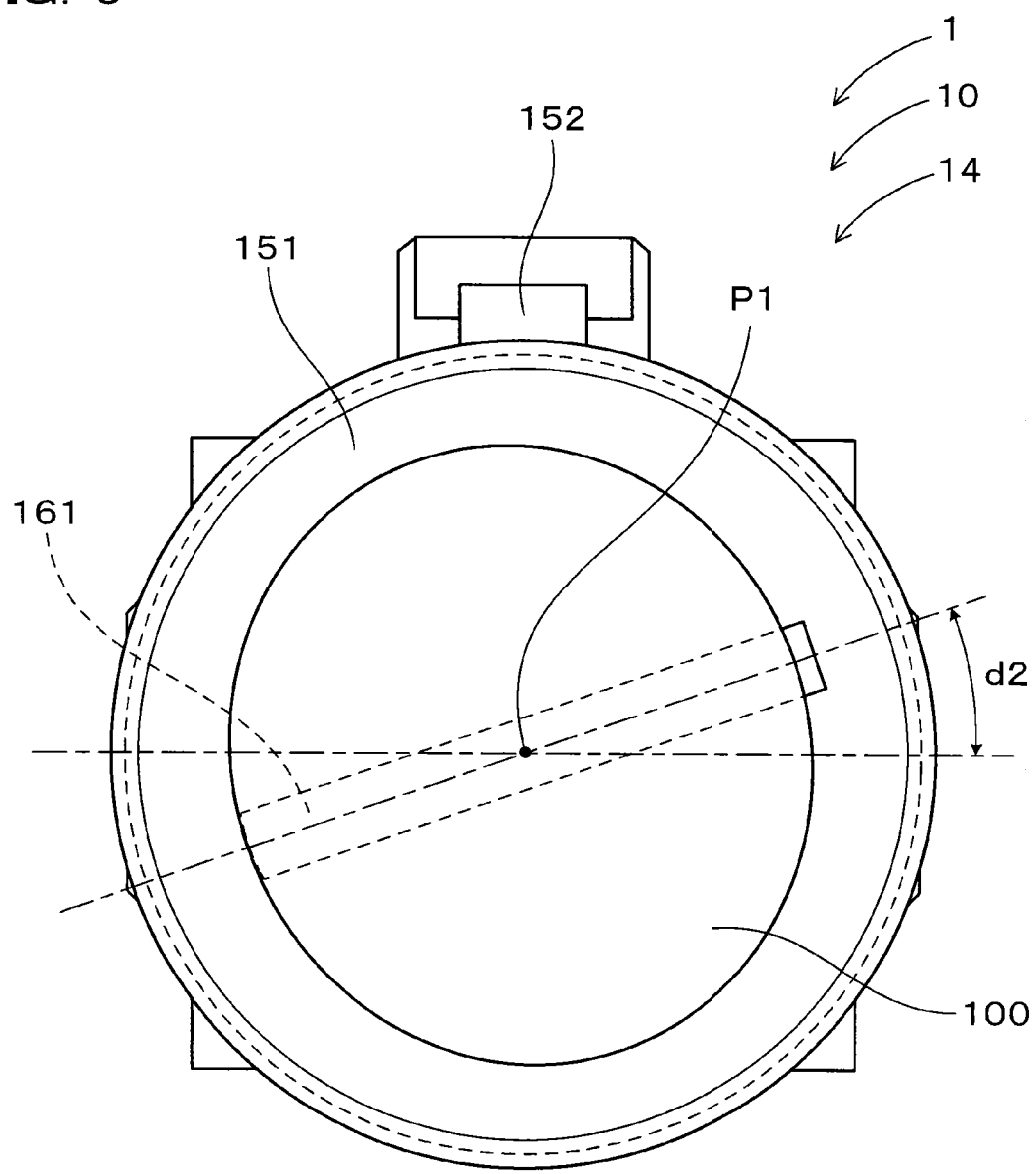
FIG. 9 is an explanatory view showing a rotating mechanism of the angle adjusting mechanism part in Example 1.

Then, as shown in FIG. 9, the tilting direction of the dummy workpiece surface 100 is set by the rotary gear 151 of the tilt adjusting mechanism part 14.

The meshing between the rotary gear 151 and the fixing block 152 is released to rotate the rotary gear 151 by a rotation angle d2. Then, the rotary gear 151 and the fixing block 152 are meshed with each other again to fix the rotary gear 151.

It is noted that the center of the dummy workpiece surface 100 is in the same position before and after setting of the tilt angle and tilting direction.

This results in the completion of the adjustment of the position, tilting direction and tilt angle of the dummy workpiece surface 100 in the positioning jig 10.

In this Example, the four vacuum cups 51 and the corresponding four positioning jigs 10 are used, and the adjustment of the position, tilting direction and tilt angle of the dummy workpiece surface 100 in the respective positioning jigs 10 is set based on the position and tilt angle of the respective suction target surfaces.

The number of the vacuum cups 51 to be provided in one handling attachment is determined depending on the shape and weight of a workpiece, and at least one positioning jig 10 may be needed. When the number of the positioning jigs 10 is smaller than the number of the vacuum cups 51, the positioning jigs 10 which have finished the support member molding step can be used for positioning of the other vacuum cups 51.

Next, the process is shifted to the step of forming the support member 55 for holding the vacuum cups 51 by adjusting the shape of a support member 55.

In the step of forming a support member in this Example, adjustment is carried out through in combination of the bending of a support pipe 554, expansion/contraction and rotation between the support pipe 554 and a small-diameter pipe 52 and rotation between the small-diameter pipe 52 and the vacuum cup 51 to match the position, tilting direction and tilt angle of the vacuum cup 51 with those of the dummy workpiece surface 100. This operation is applied to all the vacuum cups 51, and the positions of all the vacuum cups 51 are fixed by use of a fixing means such as a fixing bolt 555. Thus, the production of the handling attachment 5 is completed.

In this Example, the height position and tilt of the dummy workpiece surface 100 are set to desired position and tilt so that the suction target surface of a workpiece can be simulated and reproduced by the dummy workpiece surface 100. Thus, also at a stage prior to the completion of the workpiece, the vacuum cups 51 can be positioned using the device 1 for positioning the vacuum cups 51, thereby producing the handling attachment 5.

Also, accuracy deterioration factors such as dimensional errors and deflection, which are unavoidable in a case of using a workpiece, can be eliminated by setting the height and tilt angle of the above-described dummy workpiece surface 100 by means of the positioning jigs 10. This can improve the accuracy in positioning of vacuum cups 51 to provide a handling attachment 5 with high accuracy.

Also, in the process for producing a handling attachment 5, information about the height, tilt direction and tilt angle is preliminarily obtained from design data and the like, and then the dummy workpiece surface 100 of the positioning device 1 can be set based on this information. Thus, a handling attachment 5 with high accuracy can be produced also at a stage before the completion of the workpiece.

In the positioning device 1, the positioning jig 10 is allowed to change the arrangement position on the base plate 2. Therefore, it is possible to easily adjust the position of the dummy workpiece surface 100 in the lateral direction X orthogonal to the height direction Z and the depth direction Y.

The positioning jig 10 has a rotating mechanism 15 which rotates the dummy workpiece surface 100 around, as the rotation center, the vertical axis 150 which passes though the center of the dummy workpiece surface 100, and a tilting mechanism 16 which tilts the dummy workpiece surface 100 around, as the rotation center, the lateral axis 160 which passes through the center of the dummy workpiece surface 100 and is orthogonal to the vertical axis 150. Therefore, the tilt angle of the dummy workpiece surface 100 can be easily set by two elements: the rotation angle around the vertical axis 150 as the rotation center and the tilt angle around the lateral axis 160 as the rotation center.

Further, both of the vertical axis 150 which serves as the rotation center of the rotating mechanism 15 and the lateral axis 160 which serves as the rotation center of the tilting mechanism 16 pass through the center of the dummy workpiece surface 100. Therefore, the center of the dummy workpiece surface 100 is located in the same position before and after setting of the tilt angle of the dummy workpiece surface 100 by means of the rotating mechanism 15 and the tilting mechanism 16. Thus, the position of the dummy workpiece surface 100 is set based on the center thereof as a reference, so that readjustment of the position in the dummy workpiece surface 100 can be omitted also when the tilt angle is changed. This can improve the work efficiency in adjusting the position and angle of the dummy workpiece surface 100.

Accordingly, by setting the position of the dummy workpiece surface 100 based on the center as a reference, readjustment of the position of the dummy workpiece surface 100 can be omitted also when the tilt angle is changed. This can improve the work efficiency in adjusting the position and tilt angle of the dummy workpiece surface 100.

Also in the process for producing a handling attachment 5, the support member 55 has a coupling part 551 to be coupled to a carrying device prepared separately and a plurality of support pipes 554 provided extendingly from the coupling part 551 to hold the vacuum cups 51 at the tip ends thereof, and the support member 55 is preformed to hold the vacuum cups 51 at the tip ends of the support pipes 554 and to position the vacuum cups 51 close to the dummy workpiece surfaces 100 prior to forming the support member. Therefore, the support pipes 554 are readily formed in a short time in the step of forming the support member.

The vacuum cup positioning device and the process for producing a handling attachment using the vacuum cup positioning device in this Example enable the production of a handling attachment with high accuracy also at a stage before the completion of the workpiece.

The invention claimed is:

1. A vacuum cup positioning device for use in the production of a handling attachment having a plurality of vacuum cups to suction-hold a suction target surface of a workpiece and a support member which holds the vacuum cups so as to maintain a position relation among the vacuum cups, the vacuum cup positioning device comprising:
   a base plate; and
   a plurality of positioning jigs, each of the plurality of positioning jigs being disposed on the base plate, the plurality of positioning jigs each having an upper end;
   wherein each of the plurality of positioning jigs comprise, at their respective upper end, a dummy workpiece surface to be abutted with a respective vacuum cup, and
   wherein the dummy workpiece surface is allowed to change a height position and to tilt in any direction.

2. The vacuum cup positioning device according to claim 1, wherein the positioning jigs are allowed to change a position to be disposed on the base plate.

3. The vacuum cup positioning device according to claim 2, wherein the positioning jigs include a rotating mechanism to rotate the dummy workpiece surface around a vertical axis which passes through a center of the dummy workpiece surface and a tilting mechanism to tilt the dummy workpiece surface in one direction around a lateral axis which is orthogonal to the vertical axis.

4. The vacuum cup positioning device according to claim 3, wherein the lateral axis which serves as a rotation center of the tilting mechanism passes through the center of the dummy workpiece surface.

5. The vacuum cup positioning device according to claim 1, wherein the positioning jigs include a rotating mechanism to rotate the dummy workpiece surface around a vertical axis which passes through a center of the dummy workpiece surface and a tilting mechanism to tilt the dummy workpiece surface in one direction around a lateral axis which is orthogonal to the vertical axis.

6. The vacuum cup positioning device according to claim 5, wherein the lateral axis which serves as a rotation center of the tilting mechanism passes through the center of the dummy workpiece surface.

7. A process for producing a handling attachment having a plurality of vacuum cups to suction-hold a suction target surface of a workpiece and a support member which holds the vacuum cups so as to maintain a position relation among the vacuum cups, the process comprising:
   a step of adjusting the dummy workpiece surfaces of the respective positioning jigs in the vacuum cup positioning device according to claim 1 have respectively predetermined height, tilting direction and tilt angle; and
   a step of forming the support member for holding the vacuum cups by adjusting the shape of the support member so that the vacuum cups are abutted with the dummy workpiece surfaces.

8. The process for producing a handling attachment according to claim 7, wherein the support member has a coupling part to be coupled to a carrying device prepared separately and a plurality of support pipes provided extendingly from the coupling part to hold the vacuum cups at a respective tip end thereof, and wherein the support member is preformed to hold the vacuum cups at the tip ends of the support pipes and to position the vacuum cups close to the dummy workpiece surfaces prior to forming the support member.

9. A process for producing a handling attachment having a plurality of vacuum cups to suction-hold a suction target surface of a workpiece and a support member which holds the vacuum cups so as to maintain a position relation among the vacuum cups, the process comprising:
   a step of adjusting the dummy workpiece surfaces of the respective positioning jigs in the vacuum cup positioning device according to claim 4 to have respectively predetermined height, tilting direction and tilt angle; and
   a step of forming the support member for holding the vacuum cups by adjusting the shape of the support member so that the vacuum cups are abutted with the dummy workpiece surfaces.

10. The process for producing a handling attachment according to claim 9, wherein the support member has a coupling part to be coupled to a carrying device prepared separately and a plurality of support pipes provided extendingly from the coupling part to hold the vacuum cups at a respective tip end thereof, and wherein the support member is preformed to hold the vacuum cups at the tip ends of the support pipes and to position the vacuum cups close to the dummy workpiece surfaces prior to forming the support member.

* * * * *